United States Patent
Cruz et al.

(10) Patent No.: US 8,448,533 B2
(45) Date of Patent: May 28, 2013

(54) BASEPLATE FOR USE IN PARTICLE ANALYSIS

(75) Inventors: Dennis Quinto Cruz, Longmont, CO (US); Nathaniel Patrick Sheppleman, Longmont, CO (US); Carl John Naley, Decorah, IA (US); Tommy Joe Metzner, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 1276 days.

(21) Appl. No.: 12/239,967

(22) Filed: Sep. 29, 2008

(65) Prior Publication Data

US 2010/0080098 A1    Apr. 1, 2010

(51) Int. Cl.
*G01N 1/24* (2006.01)
*G11B 25/04* (2006.01)

(52) U.S. Cl.
CPC .................................. *G11B 25/043* (2013.01)
USPC .................................... 73/864.33; 360/99.16

(58) Field of Classification Search
USPC ............ 360/97.11, 97.19, 97.2, 98.01, 99.15, 360/99.16, 99.18, 99.2; 134/32, 147; 73/864.33, 73/865.9; 369/53.12, 53.1; 220/4.03, 4.02, 220/4.01, 610, 682
See application file for complete search history.

(56) References Cited

U.S. PATENT DOCUMENTS

| | | | | |
|---|---|---|---|---|
| 3,731,291 | A | 5/1973 | Walsh | 360/97.17 |
| 5,004,207 | A * | 4/1991 | Ishikawa et al. | 248/632 |
| 6,052,277 | A | 4/2000 | Liu et al. | 861/679.8 |
| 6,543,119 | B2 | 4/2003 | Jenkins et al. | 29/430 |
| 6,560,063 | B1 | 5/2003 | Keffeler et al. | 360/99.16 |
| 2006/0187576 | A1* | 8/2006 | Xu et al. | 360/97.01 |
| 2007/0003213 | A1 | 1/2007 | Kang et al. | 386/220 |
| 2009/0229639 | A1* | 9/2009 | Metzner et al. | 134/32 |

FOREIGN PATENT DOCUMENTS

JP         10222460 A     8/1998

* cited by examiner

*Primary Examiner* — Peter Macchiarolo
*Assistant Examiner* — Tamiko Bellamy
(74) *Attorney, Agent, or Firm* — Braden Katterheinrich

(57) ABSTRACT

A test baseplate is configured to support and expose at least one storage device component to particle evacuation and particle analysis. The test baseplate includes a base having an upper surface that extends between an outer peripheral wall and an inner peripheral wall and having a lower surface defined by the inner peripheral wall. The test baseplate also includes a top clamp configured to be fastened to the upper surface of the base to secure the at least one storage device component to the base.

16 Claims, 7 Drawing Sheets

BASEPLATE FOR USE IN PARTICLE ANALYSIS

BACKGROUND

A typical data electronics enclosure includes a rigid housing that encloses a variety of components. One of the more prevalent reliability issues in electronic devices is failures caused by particle contamination in the housing. The particulates can cause failure to sensitive electronic components and printed circuit boards in the housing. Frequently, the particles that become present originate from materials and components assembled in the housing.

Extracting particles from components before assembling the components in a product and analyzing the extracted particles can be accomplished using liquid particle count (LPC) analysis and hard particle analysis (HPA). In both LPC and HPA, particles are extracted from a component or an assembly of components that are submerged into a liquid using an applied energy source, such as ultrasonic energy. The energy source removes particulates from the components and then moves them into the liquid. In LPC, the liquid is tested to determine a size and an amount of particles that were extracted from the component or assembly of components, while in HPA, the liquid is filtered and tested to determine what kind of particles were extracted along with a determination of size and amount of particles.

Unfortunately, the equipment used for employing the LPC and HPA methods of extracting particles from components are not production-ready tools for analyzing particles during manufacture. Analyzing particles using these methods are time consuming and can not be employed in a clean room environment. In addition, the ultrasonic extraction of particles from components can be destructive to the component.

SUMMARY

A test baseplate is configured to support and expose at least one storage device component to particle evacuation and particle analysis. The test baseplate includes a base having an upper surface that extends between an outer peripheral wall and an inner peripheral wall and a lower surface defined by the inner peripheral wall. Together, the upper surface, outer peripheral wall, inner peripheral wall and the lower surface form a component cavity. The test baseplate also includes a top clamp configured to be fastened to the upper surface of the base to secure the at least one storage device component to the base.

The top clamp includes a top surface, a bottom surface, an outer peripheral edge that is configured for alignment with the outer peripheral wall of the base and an inner peripheral edge that is configured for alignment with the inner peripheral wall of the base. The inner peripheral edge defines an opening in the top clamp that extends between the top surface and the bottom surface.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments, some discussed in detail below, include a test baseplate having a base and a top clamp. For purposes of a description of illustrative embodiments, the following describes a test baseplate suited for use with a disc drive data storage device. However, the claimed embodiments are not limited to the illustrative embodiments. In other embodiments, for example, a test baseplate can be used with a solid state storage device or with other types of electronic devices where the control of particle contamination is important.

One or more storage device components normally assembled into a base of a data storage system are temporarily positioned into the base of a test baseplate and held in place by a top clamp. The storage device components temporarily positioned into the base of the test baseplate are those components that require particle extraction and analysis. After the storage device components are securely positioned in the test baseplate, the test baseplate is subjected to a particle purge using a particle purge system that utilizes, for example, dry air as a purge fluid.

A particle purge system can expose the test baseplate that is securing storage device components to a shock input, controlled input fluid flow and controlled evacuation fluid flow to remove particulates. To ensure storage device component quality, a metrology device can be provided for the quantification and qualification of particles removed from the storage device components temporarily positioned in the test baseplate. Use of the test baseplate in combination with the metrology device improves process yield of data storage systems by identifying and reducing component level contamination. In addition, the test baseplate can be used in qualifying particles that are on incoming components from a supplier in real-time and in a manner that prevents destruction of individual drive components.

Figure 1:
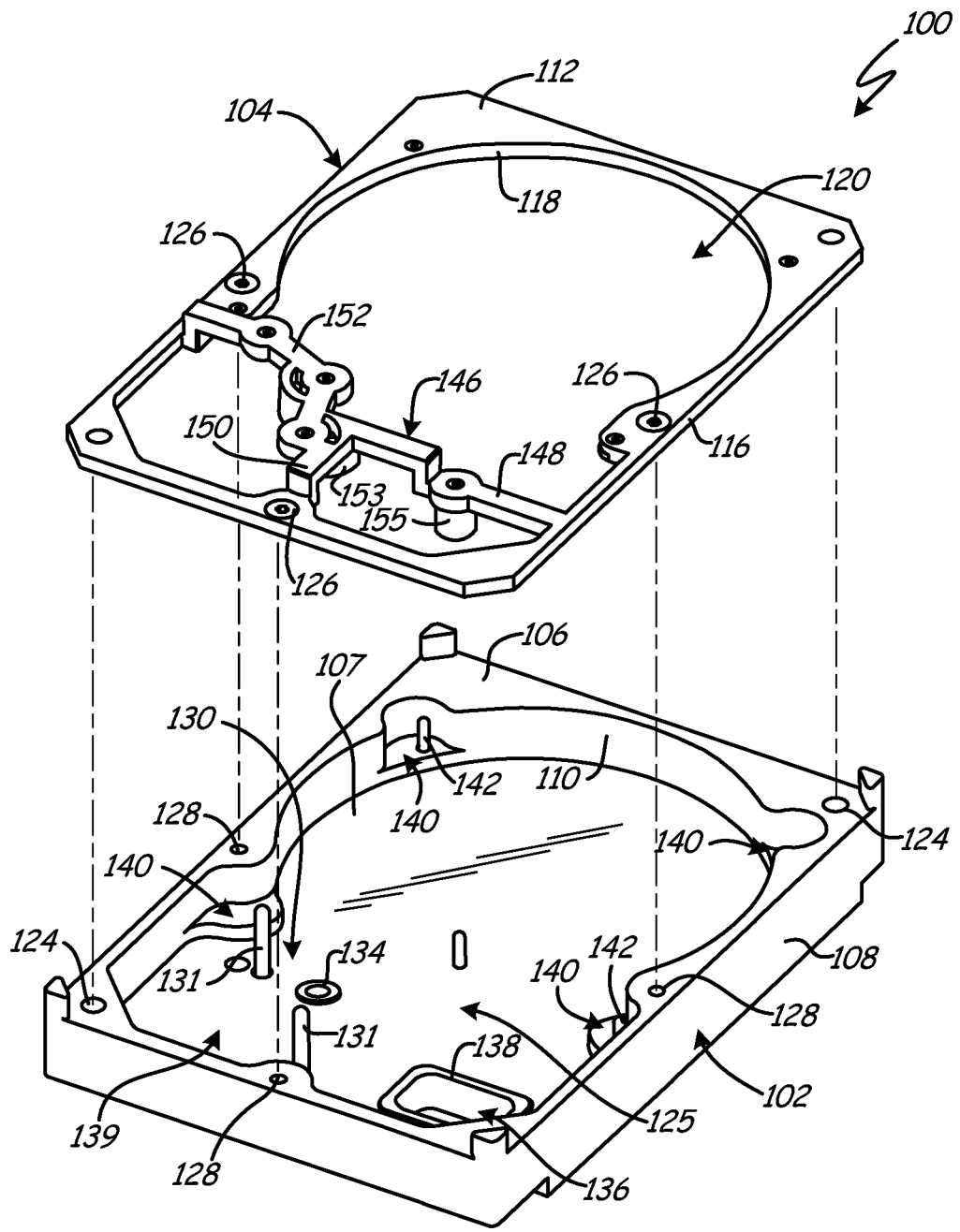
FIG. 1 is an exploded top perspective view of a test baseplate under one embodiment.
Figure 2:
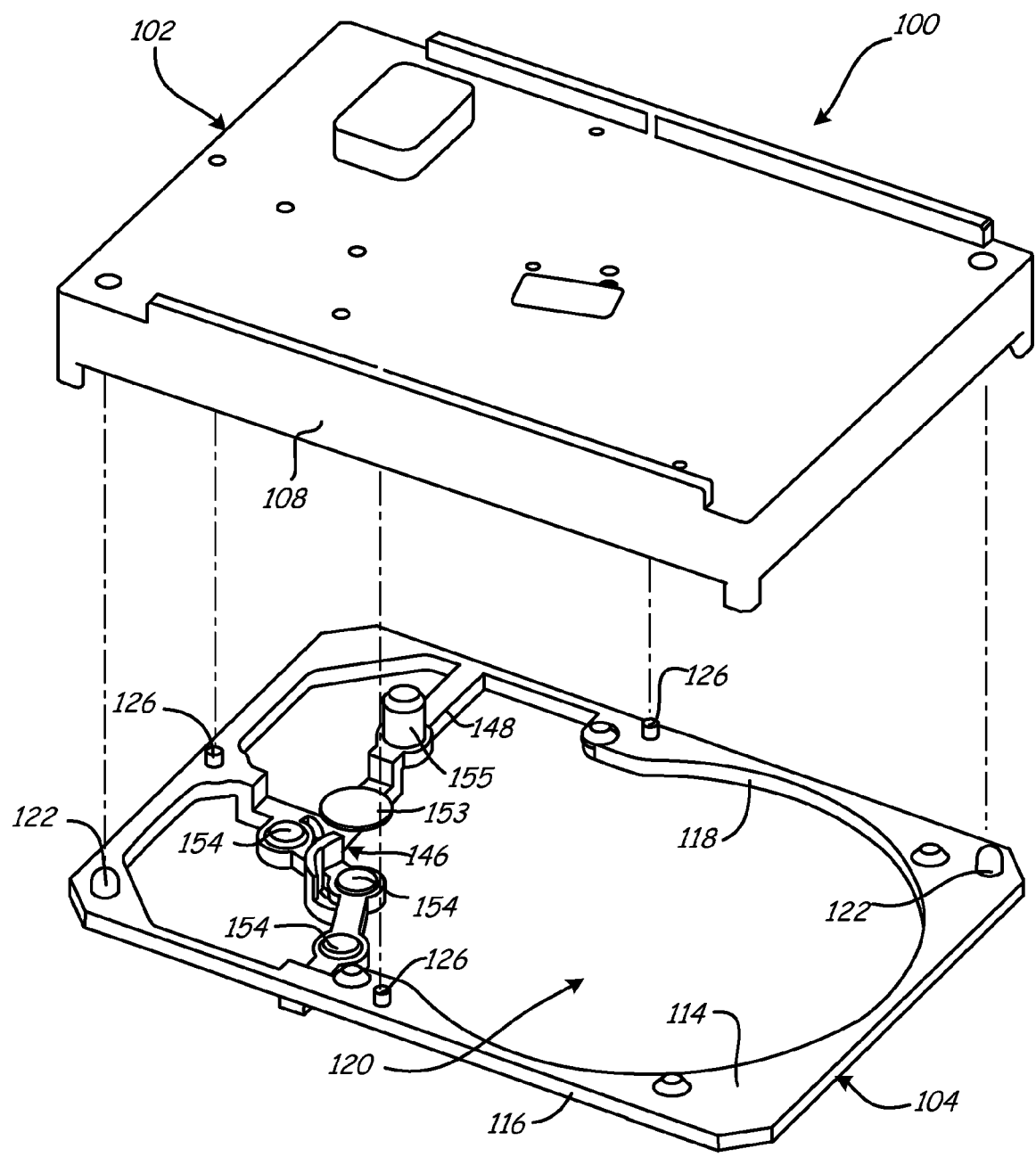
FIG. 2 is an exploded bottom perspective view of the test baseplate illustrated in FIG. 1.

FIG. 1 is an exploded top perspective view of a test baseplate 100 under one embodiment, while FIG. 2 is an exploded bottom perspective view of test baseplate 100. Test baseplate 100 includes a base 102 and a top clamp 104 exploded from base 102. Like the base of a normal data storage device, base 102 is configured to support at least one storage device component. Unlike the base of a normal data storage device, however, top clamp 104 of test baseplate 100 is a frame that is configured to secure the at least one storage device component to the base. Normally, each component in the base of a normal data storage device is secured to the base by its own fastening mechanism. In the present embodiment, all storage device components that are to be supported by test baseplate 100 are secured to base 102 with only top clamp 104. This way, components can easily be put into the test baseplate 100 for performing a particle purge and easily be taken out of the test baseplate 100 after the particle purge is performed.

Base 102 includes an upper surface 106 (FIG. 1) and a lower surface 107 (FIG. 1). Upper surface 106 extends between an outer peripheral wall 108 and an inner peripheral wall 110 (FIG. 1) and inner peripheral wall 110 defines lower surface 107. Top clamp 104 includes a top surface 112 (FIG. 1), a bottom surface 114 (FIG. 2), an outer peripheral edge 116 and an inner peripheral edge 118. Inner peripheral edge 118 of top clamp 104 defines an opening 120 that extends between top surface 112 and bottom surface 114.

Figure 3:
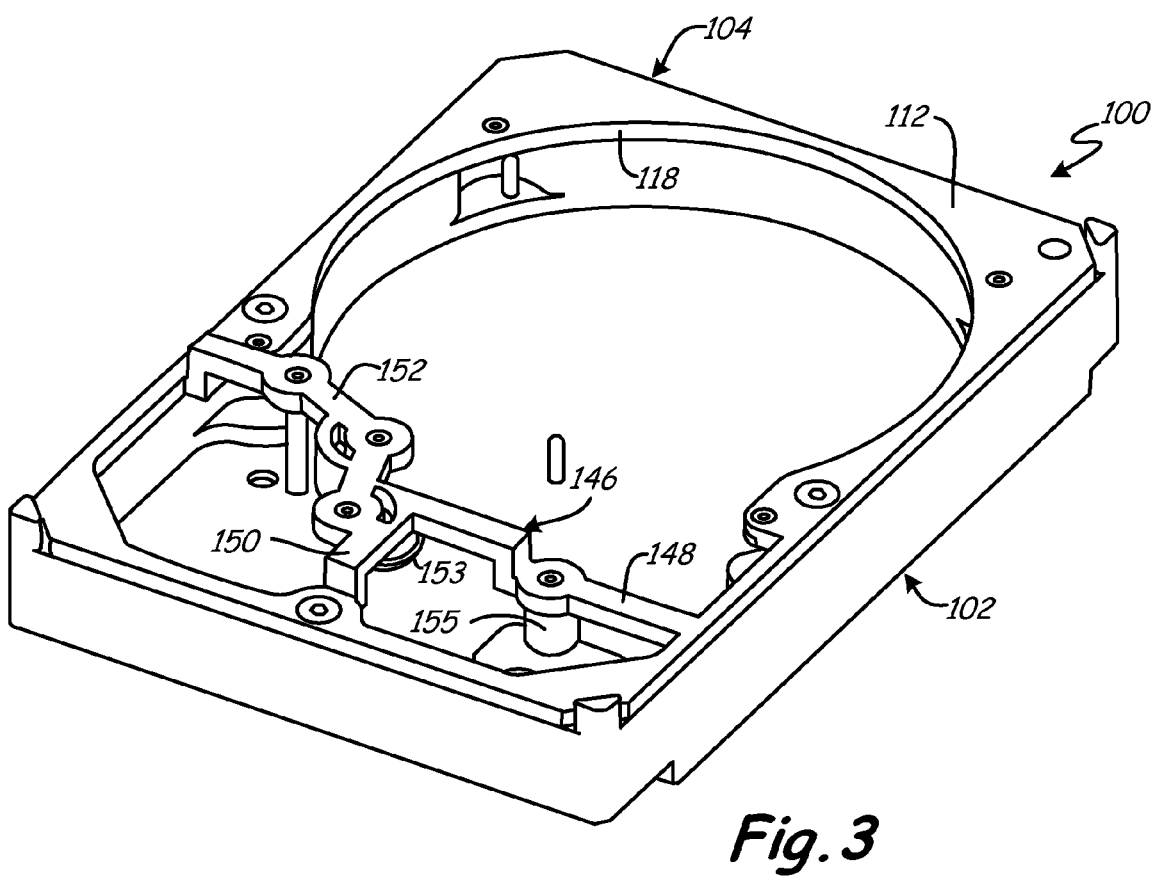
FIG. 3 is a top perspective view of the test baseplate illustrated in FIG. 1.

FIG. 3 illustrates a top perspective view of test baseplate 100. In FIG. 3, top clamp 104 is fastened to the upper surface 106 (FIG. 1) of base 102 to form test baseplate 100. In particular, upper surface 106 of base 102 is in contact with bottom surface 114 of top clamp 104, portions of outer peripheral edge 116 of top clamp 104 are in alignment with the outer peripheral wall 108 of base 102 and the inner peripheral edge 118 of top clamp 104 is in alignment with the inner peripheral wall 110 of base 102.

Referring back to FIG. 2, top clamp 104 includes a pair of alignment pins 122 that are located at opposite corners from each other. Alignment pins 122 protrude from bottom surface 114 and are configured to mate with alignment pin openings 124 (FIG. 1) located in base 102. Alignment pin openings 124 are recessed into base 102 from upper surface 106. By mating alignment pins 122 with alignment pin openings 124, top clamp 104 can be correctly aligned to base 102. While FIG. 1 illustrates alignment pins 122 being coupled to and through top clamp 104, it is also possible for alignment pins 122 to be integrally formed with top clamp 104 and therefore not need to extend through a thickness of the top clamp.

Test baseplate 100 includes a plurality of fasteners 126. Fasteners 126 are configured to extend from top clamp 104 and into openings 128 (FIG. 1) that are recessed from top surface 106 into base 102. Fasteners 126 provide the mechanical force for allowing top clamp 104 to secure and affix storage device components within base 102. However, it should be realized that other forms of providing a mechanical force for allowing top clamp 104 to secure and affix storage device components within base 102 are possible.

Like a base of a normal data storage device, base 102 includes a component support cavity 125 configured to accommodate certain components associated with a data storage device, such as a voice coil motor, actuator servo electronics and disc separator plates. It should be realized that like a normal data storage device, cavity 125 has general and not absolute boundaries.

Component cavity 125 of base 102 includes a plurality of pockets for accommodating certain types of storage device components. As illustrated in FIG. 1, component cavity 125 includes a head stack assembly (HSA) pocket 130 for receiving an HSA. HSA pocket 130 is defined by a pair of pins 131 that protrude from the lower surface 107 of base 102. HSA pocket 130 also includes an opening 134 in lower surface 107 for accommodating a bearing of the HSA. Component cavity 125 also includes a flexible printed circuit (FPC) clamp pocket 136. FPC clamp pocket 136 is configured to receive an FPC clamp that is attachable to an HSA assembly. FPC clamp pocket 136 includes an opening 138 recessed into base 102 from lower surface 107 for receiving an FPC clamp. Base 102 also includes a voice coil motor (VCM) pocket 139. VCM pocket 139 is defined between the HSA pocket 130 and outer peripheral wall 110. VCM pocket 139 is designed to accommodate a voice coil motor assembly (VCMA).

Component cavity 125 of base 102 is in communication with a plurality of platforms 140. Platforms 140 accommodate portions of a media separator plate (which is a certain type of storage device component) for mounting to base 102. Platforms 140 are recessed from upper surface 106 of base, but are raised above lower surface 107. In addition, platforms 140 are proximate to inner peripheral wall 110. Some of the platforms 140 include a pin 142 for receiving openings in portions of a media separator plate.

With reference to both FIGS. 1 and 2, top clamp 104 includes a cross member 146 coupled to the inner peripheral edge 118 that extends across opening 120 that covers component cavity 125. Cross member 146 includes three legs 148, 150 and 152 and is configured to contact and retain storage device components that are in component cavity 125 to base 102. One end of each leg 148, 150 and 152 is coupled to the inner peripheral edge 118 of top clamp 104. Therefore, cross member 146 is coupled to the inner peripheral edge 118 at three different points. The other or opposing end of each leg 148, 150 and 152 is coupled to one of the other legs. It should be realized, however, that top clamp 104 can include a plurality of different cross members positioned in various places in opening 120 and over component cavity 125 having any number of legs coupled to inner peripheral edge 118. In addition, while FIGS. 1-3 illustrate cross member 146 as being formed integrally with inner peripheral edge 118, it should be realized that cross member 146 can be made separately and attached to the inner peripheral edge 118.

Coupled to a bottom surface of cross member 146 includes a plurality of pads, such as a pad 153, pads 154 and a padded protrusion 155. Each of pads 153, 154 and 155 are located above where a storage device component should be placed in base 102 to thereby secure the storage device component to the base 102 without damaging the storage device components. As illustrated in FIGS. 2 and 3, a padded protrusion 155 is coupled to first leg 148 and positioned above FPC clamp pocket 136 so that the padded protrusion 155 can assist the top clamp 104 in holding a FPC clamp in place. Pad 153 and pads 154 are coupled to third leg 152 and positioned above HSA pocket 130 and VCM pocket 138 so that the pads can assist the top clamp 104 in holding a rotatable bearing shaft of an HSA and a VCMA in place.

As is more clearly illustrated in FIG. 3, first leg 148 of cross member 146 extends from inner peripheral edge 118 at the same level as top surface 112. However, first leg 148 meets second leg 150 and third leg 152 at a level raised above the level of top surface 112. The lower level of the first leg allows padded protrusion 155 to come into contact with a FPC clamp. The raised levels of second leg 150 and third leg 152 allow pads 154 to make contact with an HSA and a VCMA.

Figure 4:
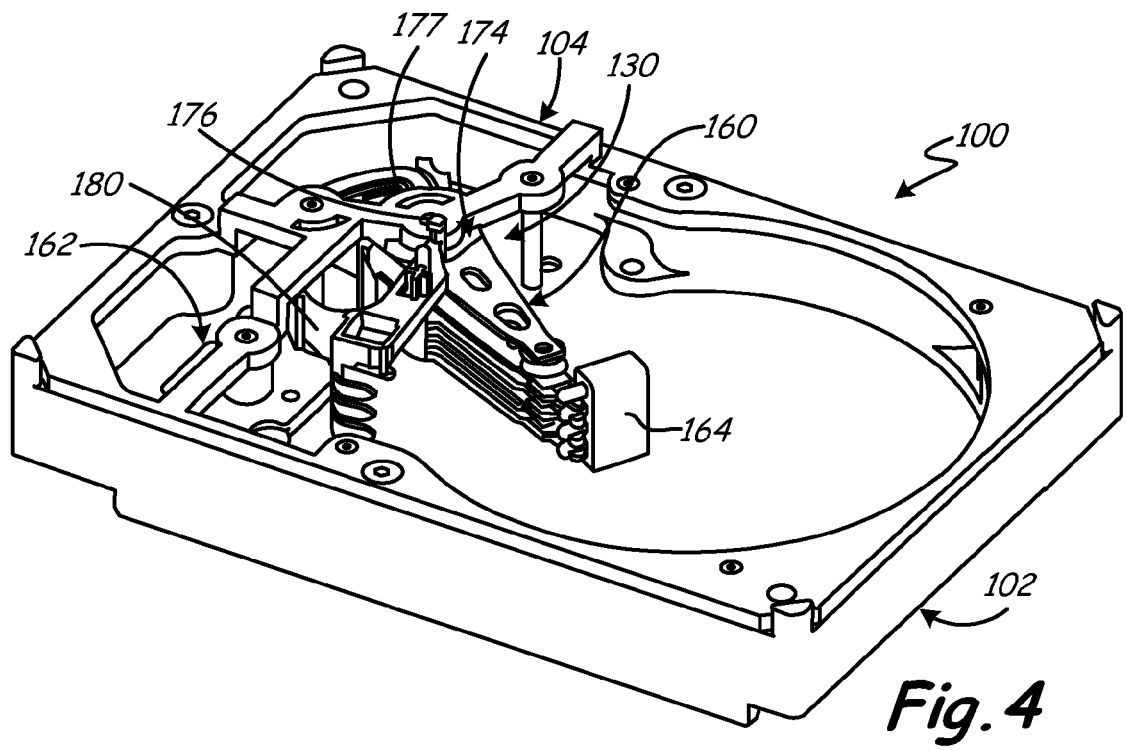
FIG. 4 is a top perspective view of the test baseplate illustrated in FIG. 1 retaining a head stack assembly and a flexible printed circuit clamp under one embodiment.

FIG. 4 is a top perspective view of the test baseplate 100 including base 102 and top clamp 104 retaining a head stack assembly (HSA) 160 and a flexible printed circuit (FPC) clamp 162 in preparation for particle evacuation and particle analysis under one embodiment. As illustrated in FIG. 4 and in the enlarged view of a comb 164 in FIG. 5, HSA 160 includes a plurality of head gimbal assemblies (HGAs) 166 supported by a suspension or load beam 170, which is in turn attached to an actuator arm 172 of an actuator mechanism 174. Each HGA 166 supports a head 168 for writing and reading data from storage media. When HSA 160 is assembled into a normal data storage system, actuator mechanism 174 includes a bearing that is rotated about a rotating bearing shaft 176 by a voice coil 177, which is to be housed in a voice coil motor assembly (not shown in FIG. 4). The actuator mechanism 174 moves the HGAs 166 along the surfaces of a stack of storage media.

Figure 5:
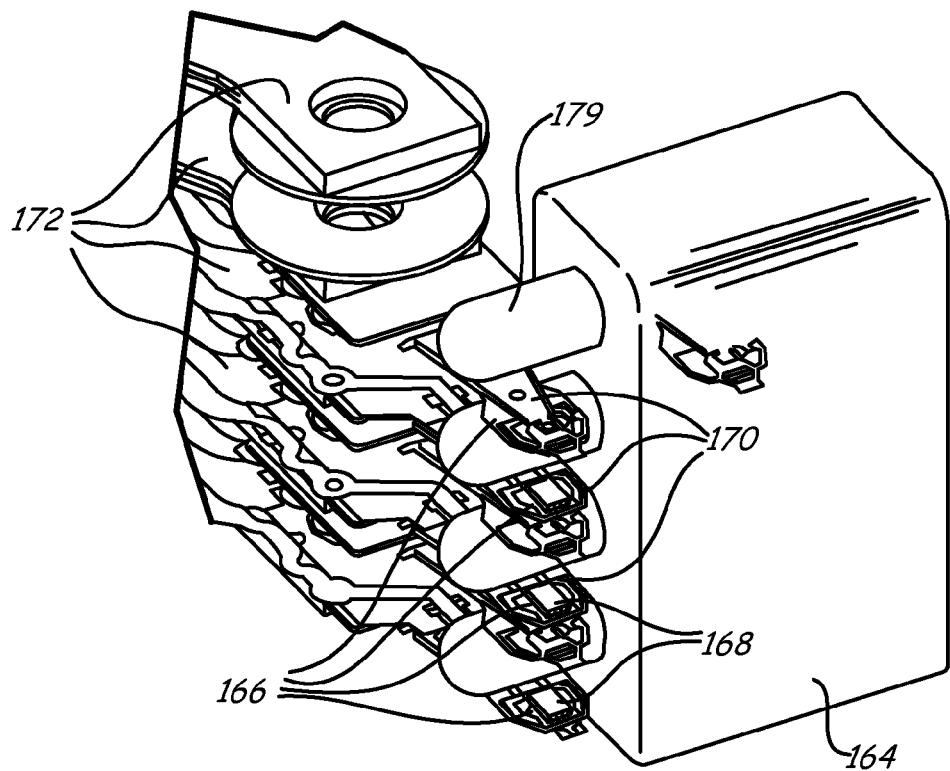
FIG. 5 is an enlarged view of a comb for supporting a head gimbal assembly of the head stack assembly illustrated in FIG. 4.
Figure 6:
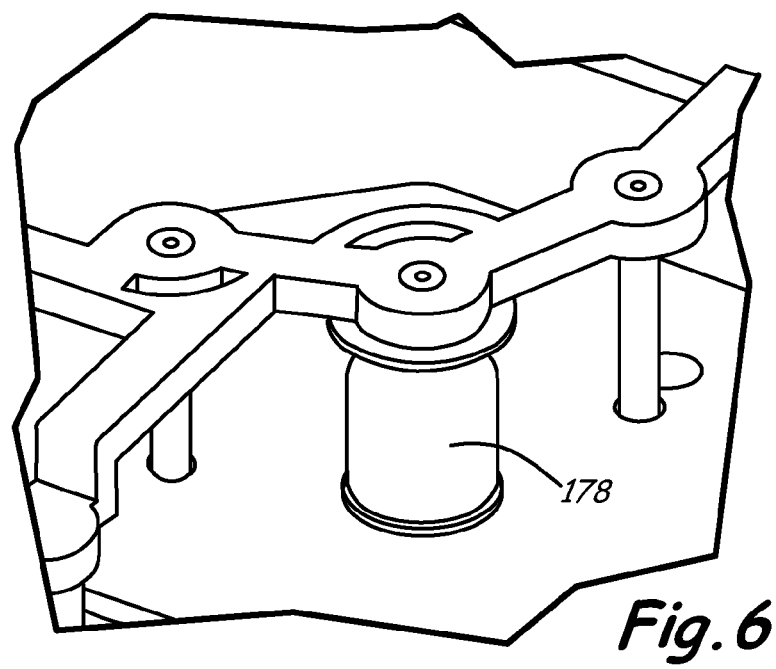
FIG. 6 is an enlarged view of a bearing simulator as attached to the base of FIG. 1 for supporting the head stack assembly illustrated in FIG. 4.

In the embodiment illustrated in FIGS. 4 and 5, HSA 160 is inserted into HSA pocket 130 and secured with a bearing (oftentimes already attached to an HSA) into opening 134 (FIG. 1). If, however, HSA 160 does not include a bearing, an alternative bearing simulator 178 can be used as is illustrated in FIG. 6. HSA 160 is either slipped on a bearing simulator 178 that is inserted into opening 134 (hidden from view in FIG. 6) or its bearing is inserted into opening 134. HSA 160 is then rotated such that HGAs 166 are supported by prongs 179 on a comb 164. Comb 164 is then removed and top clamp 104 is attached to HSA 160 to fix HSA 160 into position. In this fixed position, HSA 160 and FPC clamp 152 can be exposed to a purge gas for evacuation of particles, which can then be analyzed using a metrology unit.

Figure 7:
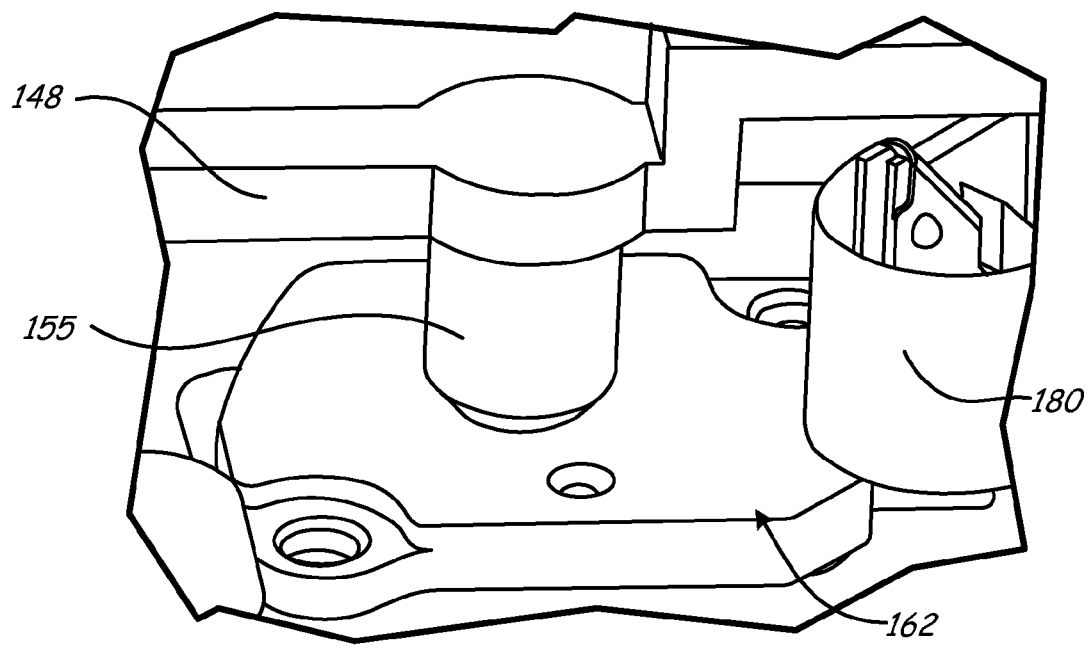
FIG. 7 is an enlarged view of the flexible circuit clamp illustrated in FIG. 4.

Oftentimes, a flexible printed circuit (FPC) 180 and FPC clamp 162 have already been assembled to HSA 160. In this instance and as illustrated in FIG. 4 and in an enlarged view in FIG. 7, FPC clamp 162 is clamped down into place in base 102 by padded protrusion 155 that is attached to first leg 148 of top clamp 104. In this fixed position, along with HSA 160, FPC clamp 162 can be exposed to a purge gas for evacuation of particles, which can then be analyzed using a metrology unit.

Figure 8:
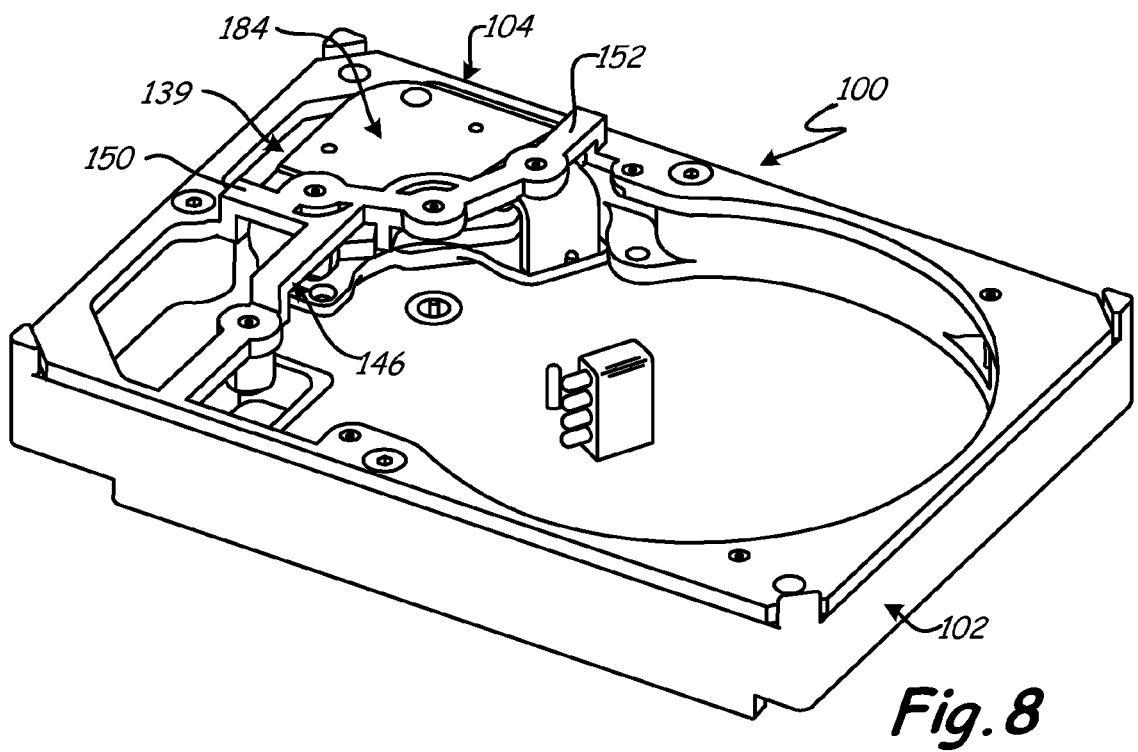
FIG. 8 is a top perspective view of the test baseplate illustrated in FIG. 1 retaining a voice coil motor assembly under another embodiment.

FIG. 8 is a top perspective view of the test baseplate 100 including base 102 and top clamp 104 retaining a voice coil motor assembly (VCMA) 184 in preparation for particle evacuation and particle analysis under one embodiment. When assembled into a normal data storage system, VCMA 184 is configured to control the track position of the heads attached to the actuator mechanism of an HSA during a seek operation.

VCMA 184 typically includes a coil, such as coil 177 (FIG. 4) attached to the actuator mechanism of a HSA, a top pole, a bottom pole and one or more permanent magnet sets having a pair of magnets with opposite polarity lying in a common plane which establish a magnetic field in which the coil is immersed. The magnet could also be (rather than two pieces) a single part with a transition zone between the two faces of opposite polarity. The top pole is attached in spaced relation to the bottom pole with magnetically permeable standoffs. The controlled application of current to the coil causes magnetic interaction between the permanent magnets and the coil so that the coil moves in accordance with the well known Lorentz relationship. The top pole and the bottom pole provide a return path for the magnetic field passing through the coil. As the coil moves, the actuator mechanism pivots about a bearing shaft assembly including a bearing, and the heads are caused to move across the surfaces of storage media.

As illustrated in FIG. 8, VCMA 184 is inserted into VCMA pocket 139 of base 102. The second leg 150 and third leg 152 of the cross member 146 of top clamp 104 are configured to fix VCMA 184 into position. In this fixed position, VCMA 184 can be exposed to a purge gas for evacuation of particles, which can then be analyzed using a metrology unit.

Figure 9:
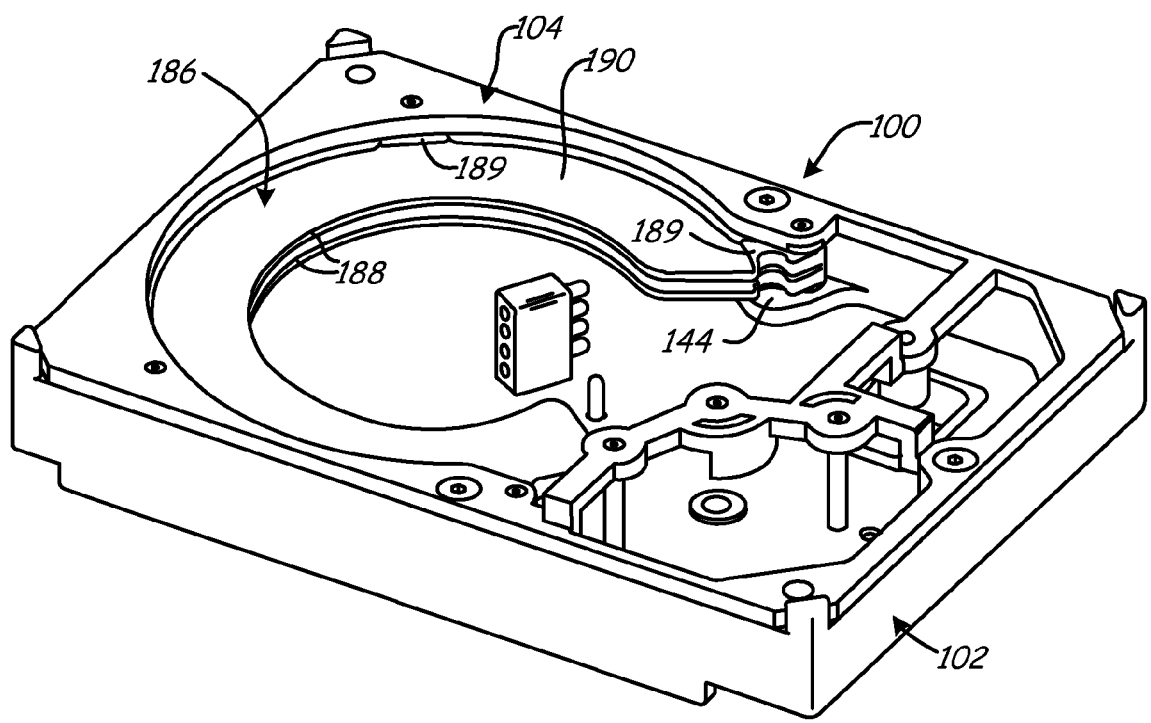
FIG. 9 is a top perspective view of the test baseplate illustrated in FIG. 1 retaining a disc separator plate under yet another embodiment.

FIG. 9 is a top perspective view of the test baseplate 100 including base 102 and top clamp 104 retaining a media separator plate 186 in preparation for particle evacuation and particle analysis under one embodiment. When assembled into a normal data storage system, media separator plate 186 is a flow control component which mitigates disturbances in airflow and attenuates vibration. Media separator plate 186 include fins 188, which are to be located between individual discs or media. Fins of the media separator plate 186 can also be located above and below discs or media.

Media separator plate 186 includes a plurality of tabs 189 that extend radially from a main body 190. Platforms 140 (only one is illustrated in FIG. 9, but more are illustrated in FIG. 1) in base 102 are provided to accommodate tabs 188. Some of the platforms 140 include pins 142 (FIG. 1). Openings (hidden from view in FIG. 9) in tabs 188 are configured to receive pins 142 coupled to platforms 140 to align media separator plate 186 into base 102. Upon alignment, top clamp 104 includes fasteners which fix media separator plate into position on the platforms 140 in base 102. In this fixed position, media separator plate 186 can be exposed to a purge gas for evacuation of particles, which can then be analyzed using a metrology unit.

It is to be understood that even though numerous characteristics and advantages of various embodiments of the invention have been set forth in the foregoing description, together with details of the structure and function of various embodiments, this disclosure is illustrative only, and changes may be made in detail, especially in matters of structure and arrangement of parts within the principles of the disclosure to the full extent indicated by the broad general meaning of the terms in which the appended claims are expressed. For example, the particular elements may vary depending on how storage device components should be secured for purging while maintaining substantially the same functionality without departing from the scope and spirit of the present invention. In addition, although the preferred embodiment described herein is directed to securing and then purging certain storage media components, it will be appreciated by those skilled in the art that the teachings of the present invention can be applied to other components of other types of electronic devices, without departing from the scope and spirit of the present invention.

What is claimed is:

1. A test baseplate comprising:
    a base configured to support at least one storage device component, the base including an upper surface that extends between an outer peripheral wall and an inner peripheral wall; and
    a top clamp configured to be fastened to the upper surface of the base to secure the at least one storage device component to the base, the top clamp including an inner peripheral edge defining an opening in the top clamp, the top clamp including a cross member extending across the opening in the top clamp and configured for retaining the at least one storage device component.

2. The test baseplate of claim 1, wherein the top clamp comprises a pair of alignment pins coupled to a bottom surface of the top clamp and the base comprises a pair of openings recessed from the upper surface and into the base, wherein the pair of openings in the base are configured to receive the pair of alignment pins of the top clamp.

3. The test baseplate of claim 1, wherein the base comprises a storage media cavity and a component cavity, the cross member extending across the opening in the top clamp above the component cavity of the base.

4. The test baseplate of claim 1, wherein the cross member comprises a plurality of legs, each leg coupled to one of the other legs at one end and coupled to the inner peripheral edge of the top clamp at an opposing end.

5. The test baseplate of claim 1, wherein a plurality of pads are positioned on a bottom surface of the cross member.

6. The test baseplate of claim 1, wherein the base comprises a storage media cavity and a component cavity, the storage media cavity being in communication with a plurality of platforms, each platform being recessed from the upper surface of the base and being raised above a lower surface of the base for supporting the at least one storage device component.

7. The test baseplate of claim 1, wherein the at least one storage device component comprises one of a head stack assembly, a flexible printed circuit clamp, a voice coil motor assembly, and a storage media separator plate.

8. The test baseplate of claim 1, wherein a lower surface of the base comprises an opening for receiving a bearing coupled to the at least one storage device component.

9. The test baseplate of claim 1, wherein a comb including a plurality of prongs for positioning heads on a head stack assembly is coupled to a lower surface of the base.

10. A test baseplate comprising:
   a base configured to support at least one storage device component, the base including a storage media cavity and a component cavity; and
   a top clamp configured to be fastened to the base to secure the at least one storage device component, the top clamp including an outer peripheral edge, an inner peripheral edge that defines an opening in the top clamp, and a cross member that extends across the opening defined by the inner peripheral edge, the cross member being positioned above the component cavity of the base.

11. The test baseplate of claim 10, wherein coupled to a bottom surface of the cross member includes a plurality of pads that are positioned on the cross member.

12. The test baseplate of claim 10, wherein the base further comprises an upper surface that extends between an outer peripheral wall and an inner peripheral wall and a lower surface defined by the inner peripheral wall.

13. The test baseplate of claim 12, wherein the top clamp further comprises a top surface and a bottom surface, the outer peripheral edge of the top clamp is in alignment with the outer peripheral wall of the base and the inner peripheral edge of the top clamp is in alignment with the inner peripheral wall of the base, the opening extending between the top surface and the bottom surface of the top clamp.

14. The test baseplate of claim 10, wherein the storage media cavity is in communication with a plurality of platforms, each platform being recessed from the upper surface of the base and being raised above the lower surface of the base for supporting the at least one storage device component and some of the platforms including a pin for being received by an opening in the at least one storage device component.

15. The test baseplate of claim 14, wherein portions of the top clamp that are positioned between the inner peripheral edge and the outer peripheral edge are secured to each pin coupled to the platforms to retain the at least one storage device component in the platforms.

16. The test baseplate of claim 10, wherein the at least one storage device component comprises one of a head stack assembly, a flexible printed circuit clamp, a voice coil motor assembly, and a storage media separator plate.

* * * * *